F. I. GIBBS.
METHOD OF PRODUCING METALLIC VESSELS BY ELECTRODEPOSITION.
APPLICATION FILED FEB. 23, 1909.

998,085.

Patented July 18, 1911.

Witnesses.

Inventor.
Frank Iorns Gibbs

UNITED STATES PATENT OFFICE.

FRANK IORNS GIBBS, OF BIRMINGHAM, ENGLAND.

METHOD OF PRODUCING METALLIC VESSELS BY ELECTRODEPOSITION.

998,085.          Specification of Letters Patent.     Patented July 18, 1911.

Application filed February 23, 1909. Serial No. 479,406.

*To all whom it may concern:*

Be it known that I, FRANK IORNS GIBBS, a subject of His Majesty the King of Great Britain and Ireland, residing at 140 Hurst street, Birmingham, England, manufacturer, have invented new and useful Improvements in Methods of Producing Metallic Vessels by Electrodeposition, of which the following is a specification.

Figure 1:
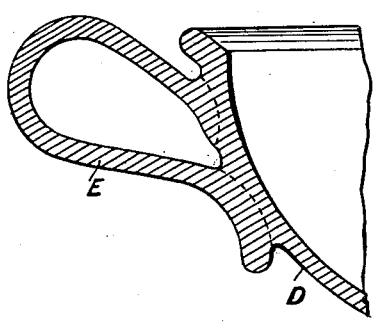
Figure 2:
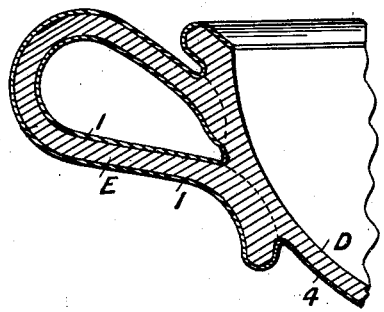
Figure 3:
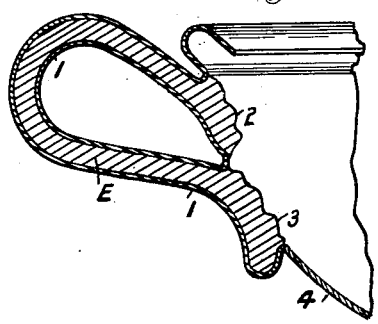
Figure 4:
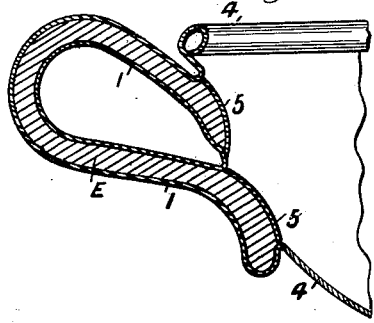
Figure 5:
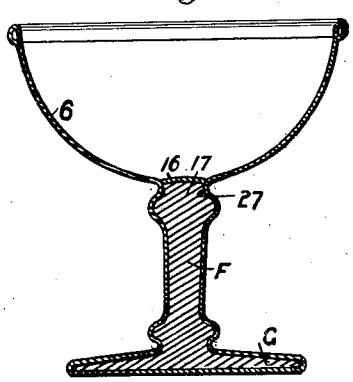

This invention consists of the herein described improvements in methods of producing metal vessels by electro-deposition, such vessels for instance as tea pots, jugs, cups, vases, drinking cups, and the like, which have projecting spouts or handles or legs or stems or bases or other like projecting parts the said metallic vessels having been formed by electro-deposition on the prepared surfaces of models of glass or potteryware or other suitable non-metallic and non-porous substance and then removed from such models, so that the body or main portion of the vessel is metal without any glass or potteryware or other non-metallic lining. In order to facilitate the production of strong spouts, handles, stems or bases or the like integral with said vessels I proceed as follows:—The glass or potteryware or other non-metallic and non-porous model is formed with the required handle or spout or legs or stem or the like in a piece therewith and these are coated with the metallic paint or other conducting material so that the metal will be electro-deposited on these handles or spout or legs or other projecting parts as well as on the body of the model, but when the body part of the model has been broken away and removed the potteryware or glass or other handles or spout or other projecting parts of the model will remain permanently embedded in the electro-deposited vessel and at their ends where they have been broken away from the model inside the vase or other article the glass or potteryware or other part can be ground down and then coated with the metallic or other conducting material and the required metal electro-deposited over these ends of the handles or projections so that they will not show on the inside of the vessel. Or if desired metal blanks may be fixed to cover these ends of the handle or parts. This will be clear by an examination of the accompanying drawings of which Figure 1 is a sectional elevation of the handle and part of a potteryware model for forming a tea cup by electro-deposition; Fig. 2 shows the same parts as Fig. 1 with the metal electro-deposited thereon; Fig. 3 shows the deposit and the handle part of the model embedded therein after the part of the model which formed the body part of the tea cup has been broken away and removed from the deposit; Fig. 4 shows the finished tea cup with the handle part of the model embedded in the deposit and entirely inclosed as hereinafter described and Fig. 5 is a sectional elevation of a metal drinking vessel or cup with the stem part of the model embedded therein.

The glass or glazed potteryware tea cup model D is formed with a handle E of similar material and integral therewith and the exterior of this handle as well as the exterior of the model D are coated with the metallic paint or other conducting material so that the metal will be electro-deposited on to the handle E as well as on to the body D as in Fig. 2, where the electro-deposit around the handle is marked 1. After the body part of the model D has been cracked and broken away from the body part 4 of the deposit the handle E will remain in the deposit and the broken away ends 2, 3 of the handle will be rough as in Fig. 3 but these are as above described afterward ground down and if desired are coated with metallic paint or other conducting material and then metal 5 is deposited over them in the interior of the vessel as shown in Fig. 4 so that now the glass or glazed potteryware handle E will be entirely inclosed inside the handle part of the metallic deposit which is an integral part of the vessel 4. Spouts, legs, feet, or other projecting parts of the metal vessel can be similarly formed on the glass or potteryware model and then be left embedded in the deposit after the body of the model has been broken away as will readily be understood. Fig. 5 shows in cross section a drinking vessel in the form of a wineglass which has been formed by electro-deposition of metal on to a wine glass model in the manner above described, and the body of the glass model has been broken away and removed leaving the metal vessel body 6 with the glass stem F and foot G part of the model in the deposit. The upper end 7 of the former glass stem where it has been broken from the body has to be ground down and may if desired be covered by a metal blank 5 or by electro-depositing metal thereon so that the top end of the glass stem will not show on the interior of the metal vessel.

From the above description it will readily be seen that spouts and other projecting parts can similarly be formed integral with the metal body of the vessel with solid portions of the original model inclosed and hidden from view in such spouts or other projecting parts as above described.

What I claim as my invention and desire to secure by Letters Patent is:—

1. The herein-described process of forming metallic vessels, which consists in providing a model comprising a body portion having a projecting portion extending outwardly therefrom, applying a conducting surface to said model, electro-depositing metal on the exterior of the surface of said body portion and of said projecting portion and removing the body portion of the model and allowing the projecting portion of the model to remain whereby the projecting portion of the finished article will comprise the projecting portion of the model and the electro-deposited metal coating upon the exterior surface thereof.

2. The herein-described process of forming metallic vessels, which consists in providing a vitreous model comprising a body portion having a projecting portion extending outwardly therefrom, applying a conducting surface to said model, electro-depositing metal on the exterior of the surface of said body portion and of said projecting portion and removing the body portion of the model and allowing the projecting portion of the model to remain whereby the projecting portion of the finished article will comprise the projecting portion of the model and the electro-deposited metal coating upon the exterior surface thereof.

3. The herein-described process of forming metallic vessels, which consists in providing a model comprising a body portion having a projecting portion extending outwardly therefrom, applying a conducting surface to said model, electro-depositing metal on the exterior surface of said body portion and of said projecting portion, removing the body portion of the model and allowing the projecting portion of the model to remain and grinding down the end of the projecting portion of the model from which the body portion of the model has been broken away.

4. The herein-described process of forming metallic vessels, which consists in providing a model comprising a body portion having a projecting portion extending outwardly therefrom, applying a conducting surface to said model, electro-depositing metal on the exterior surface of said body portion and of said projecting portion, removing the body portion of the model and leaving the projecting portion of the model to remain, grinding down the end of the projecting portion of the model from which the body portion of the model has been broken away, and covering the ground-down end with electro-deposited metal.

In testimony whereof I have signed my name to this specification in the presence of two subscribing witnesses.

FRANK IORNS GIBBS.

Witnesses:
 CHARLES BOSWORTH KETLEY,
 THOMAS JOHN ROWE.

Copies of this patent may be obtained for five cents each, by addressing the "Commissioner of Patents, Washington, D. C."